(12) United States Patent
Boyd et al.

(10) Patent No.: US 7,954,965 B1
(45) Date of Patent: Jun. 7, 2011

(54) METHOD FOR MULTIPLE GAUGES IN A SCANNING LASER BASED DISPLAY DEVICE

(75) Inventors: Michael Boyd, Saline, MI (US); Kang Li, Windsor, CA (US); George Wu, Northville, MI (US)

(73) Assignee: Yazaki North America, Inc., Canton, MI (US)

( * ) Notice: Subject to any disclaimer, the term of this patent is extended or adjusted under 35 U.S.C. 154(b) by 256 days.

(21) Appl. No.: 12/422,692

(22) Filed: Apr. 13, 2009

(51) Int. Cl.
*G01D 11/28* (2006.01)

(52) U.S. Cl. .............. 362/23; 362/29; 362/30; 116/284; 116/286; 116/288

(58) Field of Classification Search .................... 362/23, 362/30, 29; 345/7, 30, 39; 116/284, 286, 116/287, 288
See application file for complete search history.

(56) References Cited

U.S. PATENT DOCUMENTS

| | | | |
|---|---|---|---|
| 2,285,374 A | 6/1942 | Dohsmann et al. | |
| 3,448,458 A | 6/1969 | Carlson et al. | |
| 3,781,092 A | 12/1973 | Sussman et al. | |
| 3,829,771 A * | 8/1974 | Burkhardt et al. | 324/96 |
| 3,890,033 A | 6/1975 | McGee | |
| 4,484,179 A | 11/1984 | Kasday | |
| 4,553,842 A | 11/1985 | Griffin | |
| 4,761,715 A | 8/1988 | Brooks | |
| 4,762,990 A | 8/1988 | Caswell et al. | |
| 5,031,985 A | 7/1991 | Shinoda et al. | |
| 5,046,806 A | 9/1991 | Kidder et al. | |
| 5,090,791 A | 2/1992 | Kidder et al. | |
| 5,220,409 A | 6/1993 | Bures | |
| 5,294,940 A | 3/1994 | Wennagel et al. | |
| 5,353,735 A | 10/1994 | Arai et al. | |
| 5,424,533 A | 6/1995 | Schmutz | |
| 5,805,119 A | 9/1998 | Erskine et al. | |
| 5,825,495 A | 10/1998 | Huber | |
| 5,971,569 A | 10/1999 | Smith et al. | |
| 5,982,352 A | 11/1999 | Pryor | |
| 6,317,037 B1 * | 11/2001 | Ayres et al. | 340/461 |
| 6,766,036 B1 | 7/2004 | Pryor | |
| 7,084,859 B1 | 8/2006 | Pryor | |
| 7,097,316 B2 | 8/2006 | Sumiyoshi | |
| 7,193,729 B1 | 3/2007 | Li | |

(Continued)

OTHER PUBLICATIONS

U.S. Appl. No. 12/435,096, Boyd et al. U.S. Appl. No. 12/275,365, Li et al.

*Primary Examiner* — Evan Dzierzynski
(74) *Attorney, Agent, or Firm* — Harness, Dickey & Pierce, P.L.C.

(57) ABSTRACT

A display for measured quantities can include a gauge with a set of indicia spaced around the gauge to indicate the measured quantities. A window can be formed in the gauge that extends along the set of indicia. An elliptical reflector can be positioned such that a first focus of the elliptical reflector is on the same axis as the center of the gauge with this axis perpendicular to the axis connecting the foci. An optical device can be mounted on a shaft and be arranged to redirect a light beam from a second foci of the elliptical reflector onto the elliptical reflector to generate a virtual pointer in the window. Means can be provided for turning the shaft to rotate the optical device. A light source can project the light beam onto the optical device. Rotation of the optical device can enable the virtual pointer to be selectively aimed at the set of indicia.

19 Claims, 5 Drawing Sheets

U.S. PATENT DOCUMENTS

| | | |
|---|---|---|
| 7,448,341 B2 | 11/2008 | Cook et al. |
| 7,466,843 B2 | 12/2008 | Pryor |
| 7,669,543 B2 * | 3/2010 | Soltendieck et al. ......... 116/62.4 |
| 7,779,774 B2 * | 8/2010 | Liu ............................... 116/286 |
| 2008/0134956 A1 | 6/2008 | Cook et al. |
| 2008/0173233 A1 | 7/2008 | Liu |
| 2010/0236471 A1 * | 9/2010 | Cook ............................ 116/288 |

* cited by examiner

*Fig-9*

METHOD FOR MULTIPLE GAUGES IN A SCANNING LASER BASED DISPLAY DEVICE

FIELD

The present disclosure relates to analog displays for measured quantities such as automotive speed, coolant temperature, fuel level and the like, and more particularly to an instrument cluster comprising a display having multiple gauges and a single light source that illuminates unique visual indicators for each gauge of the display.

BACKGROUND

This section provides background information related to the present disclosure which is not necessarily prior art.

Automotive instrument clusters typically comprise large discreet display areas for a speedometer and a tachometer, and a number of smaller displays for coolant temperature, oil pressure, oil temperature, fuel level and the like. Arranged within and around the cluster can be other indicators showing low fluid level conditions, turn signal operation, emergency light blinkers and so forth. The analog displays within the display fields can be provided by means of devices having electromechanical movements for causing angular sweep of a needle across the display field. In many systems, low values of the measured quantity are typically displayed at the left side or bottom of the display field, high values at the right side or top of the display field, and intermediate values at incrementally spaced locations between the left and right sides.

It has become increasingly more difficult to attach cables, wires and other devices to the back side of the instrument cluster to provide all of the various desirable displays while retaining flexibility and accessibility. Moreover, all of the meter movements are difficult to calibrate and to maintain in calibration.

SUMMARY

This section provides a general summary of the disclosure, and is not a comprehensive disclosure of its full scope or all of its features.

A display for measured quantities can include a gauge with a set of indicia spaced around the gauge to indicate the measured quantities. A window can be formed in the gauge that extends along the set of indicia. An elliptical reflector can be positioned such that a first foci of the reflector and the center of the gauge are on the same axis which is perpendicular to an axis connecting the foci. An optical device can be mounted on a shaft and be arranged to redirect a light beam from a second foci of the elliptical reflector onto the elliptical reflector to generate a virtual pointer in the window. Means can be provided for turning the shaft to rotate the optical device. A light source can project the light beam onto the optical device. Rotation of the optical device can enable the virtual pointer to be selectively aimed at the set of indicia. A controller, responsive to the measured quantity, can repeatedly turn the light source on at one or more selected scan positions of the optical device, such that the position of the virtual pointer or a lit sector (bar) in the window is a representation of the current value of the measured quantity.

According to additional features, the gauge can further comprise an appliqué having the set of indicia formed therearound. The window can be defined by a semi-transparent opening formed in the appliqué. The appliqué can include a non-transparent portion inboard of the window. The non-transparent portion can be circular and define a perimeter. A centerpoint of the non-transparent portion can be on the same axis as the first foci. In one example, the optical device can be mirror having a curved reflector surface with a predetermined radius.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings. Corresponding reference numerals indicate corresponding parts throughout the several views of the drawings.

Figure 1:
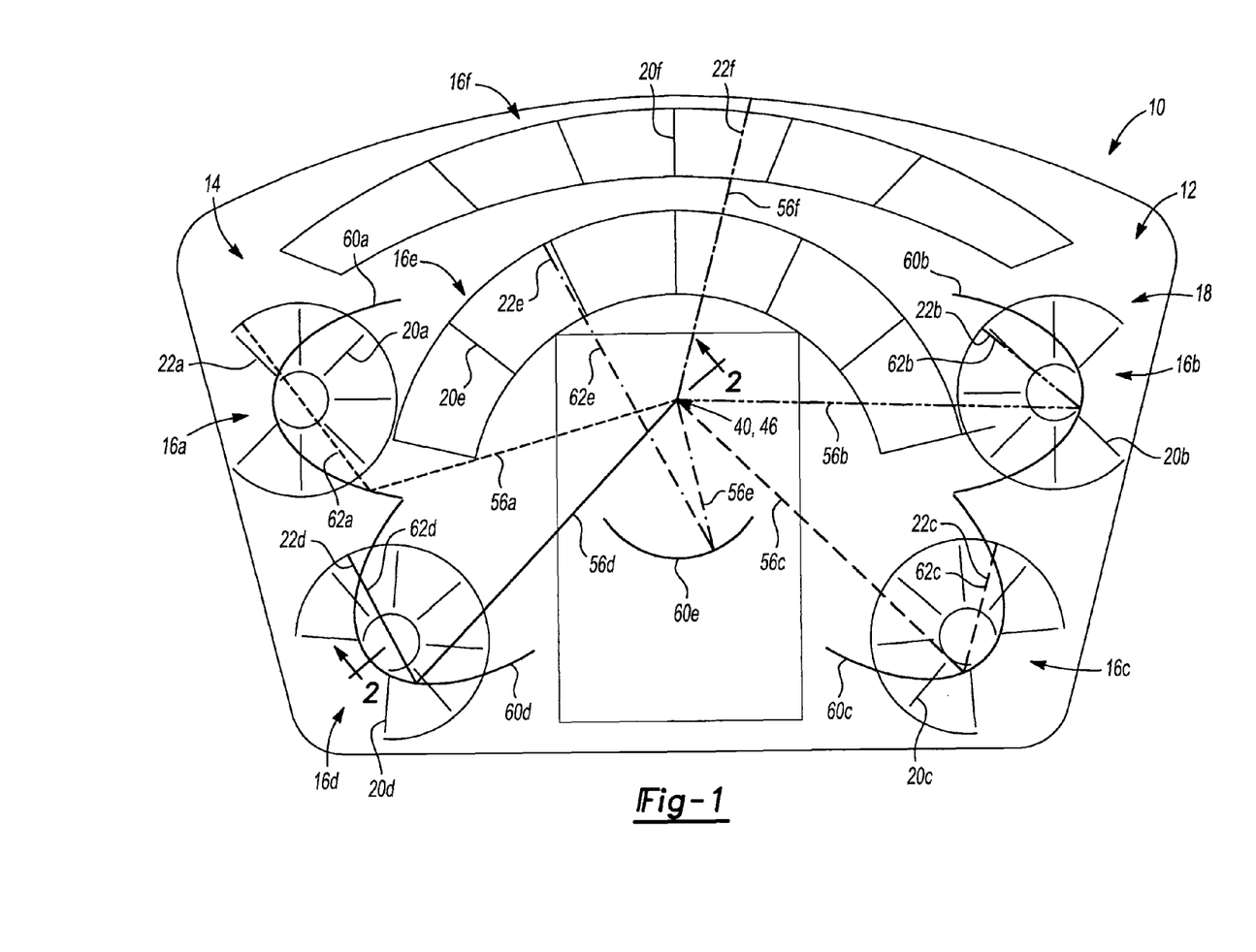
FIG. 1 is a top view of an instrument cluster according to one example of the present teachings.

With initial reference to FIG. 1, an instrument cluster constructed in accordance with one example of the present teachings is shown and generally identified at reference numeral 10. The instrument cluster 10 can include a fascia 12 having a display 14. The display 14 can comprise a plurality of gauges 16*a*-16*f*. In one example, the gauges 16*a*-16*f* can be formed in an appliqué 18. The appliqué 18 in one exemplary embodiment may be taken to be representative of a speedometer display (gauge 16*f*) for displaying vehicle speed and a tachometer display (gauge 16*e*) for displaying engine speed both with low values at the left end and higher values toward the right-most or clockwise end. The gauges 16*a*-16*d* of the appliqué 18 can represent any measured quantity such as, but not limited to, a coolant temperature, a fuel level, an oil pressure, a cabin temperature, an outside temperature, and the like. In this way, each of the gauges 16*a*-16*f* can comprise a set of indicia 20*a*-20*f*, respectively arranged generally around the gauges 16*a*-16*f* to indicate a measured quantity. Those skilled in the art will readily appreciate that while the display 14 has been described as having a speedometer to indicate vehicle speed, and a tachometer to indicate engine speed located generally at centralized locations on the top of the display 14, the locations are merely exemplary. Furthermore, the gauge locations of any of the gauges 16a-16f are interchangeable. Moreover, one or more of the gauges 16a-16f may be eliminated, or more gauges may be added without departing from the scope of the present disclosure.

It is appreciated that the cluster 10 can be arranged in any vehicle such as an automobile, an aircraft, a boat, or for various parameters in a power plant or other application displaying information to an operator. The indicia 20a-20f can be in the form of increment or scale markers that may be preprinted on the appliqué 18 to give values to the measured quantities in miles per hour, kilometers per hour, degrees, rpm, psi, etc. The outline of the appliqué 18 may also be printed, embossed or otherwise created on the fascia 12 of the cluster 10 for function and aesthetic appeal.

According to one example, illumination markers 22a-22f are created in the display 14 to identify a desired, measured quantity value on each gauge 16a-16f on the appliqué 18, such as at the indicia 20a-20f. With additional reference now to FIG. 2, the illumination markers 22a-22f are created by a light source 30, which operates in an on/off mode under the control of a high-speed controller 34. In one example, the light source 30 can comprise a laser diode. In another example, the light source 30 can comprise a light emitting diode (LED) with an optical element. The controller 34 can be configured to receive vehicle inputs 36 (FIG. 2) from various vehicle components 38. The controller 34 can include signal interpretation algorithms that interpret the vehicle inputs 36 and generate a set of light source signals as will be described. In one example, multiple transducers can be provided that are capable of sending electrical signals representing instantaneous values of the various measure quantities. The conversion of the electrical signals from analog to digital form may be carried out either within the controller 34 or externally thereof by a suitable ND converter according to the preferences of the system.

Figure 2:
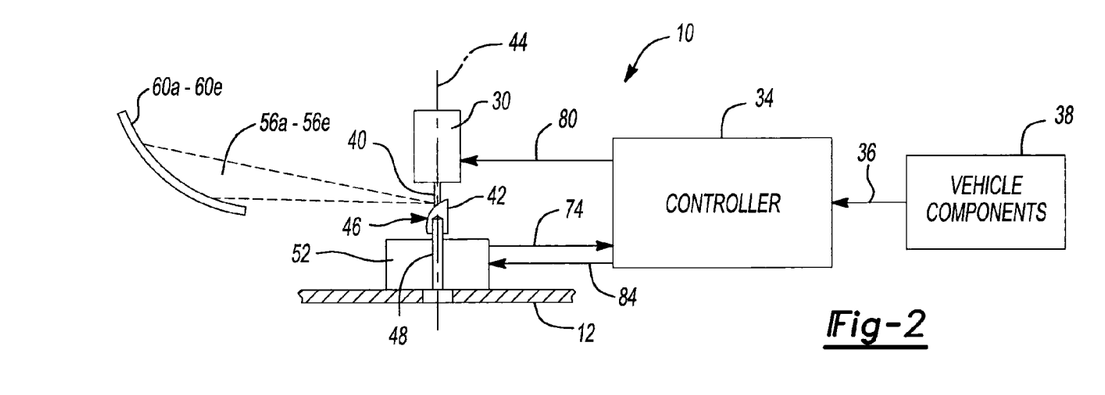
FIG. 2 is a cross-sectional view of a portion of the instrument cluster of FIG. 1.

The light source 30 according to a first example is configured to output an incident or primary beam of light 40 in a direction toward an optical device 42 that is mounted for rotation about an axis 44. The optical device 42 can be a simple curved surface mirror (like in this example embodiment) or other more complex optical components or systems that are capable to redirect and spread or focus the incident light 40. The optical device 42 can have a reflective surface 46 (FIG. 2). The optical device 42 can be rotated by way of a shaft 48 that extends from a motor 52 at a high and continuous rate of speed so that the light reflected off the optical device 42 (hereinafter referred to as secondary beams 56a-56f, FIG. 1) sweeps angularly around the shaft 48 in a clockwise fashion as explained in greater detail below.

In the exemplary configuration of FIG. 2, the optical device 42 is located generally at a central location of the display 14 and is operable to reflect light (secondary beams 56a-56f) 360° around the display 14 under the appliqué 18 to reflect off elliptical reflectors 60a-60e and therefore illuminate in any combination the indicia 20a-20e of the respective gauges 16a-16e. The light reflected off the respective elliptical reflectors 60a-60e will be hereinafter referred to as tertiary beams 62a-62e. It is appreciated that each elliptical reflector 60a-60e can have its own unique tertiary beam 62a-62e that corresponds to the illumination markers 22a-22e of the respective gauges 16a-16e. In the exemplary configuration of FIG. 1, the optical device 42 is also operable to reflect light (secondary beam 56f) onto the indicia 20F of the gauge 16F (e.g., without first reflecting off an elliptical reflector).

One of the secondary beams 56a-56f that is reflected off of the optical device 42 can also be reflected toward a photo-detector sensor (not specifically shown), the output of which is connected as an input to the controller 34 for calibrating or "zeroing" purposes explained in detail below. In one example, a signal, hereinafter angular position signal 74 (FIG. 2) can be sent from the motor 52 to the controller 34 indicative of an angular position of the shaft 48 (and therefore the angular position of the optical device 42). In one example, the motor 52 can be a brushless DC motor.

As shown in FIG. 2, the relationship of the light source 30, the optical device 42 and the motor 52 will be described in greater detail. In one example, the light source 30 can emit the incident beam 40 in a direction along the mirror axis 44. With such a configuration, the optical device 42 is operable to reflect the incident light 40 as the secondary beams 56a-56f around the display 14 in 360° of motion. According to one configuration, the indicia 20e is located at a different elevation of indicia 20f such that the secondary beam 56f can reach indicia 20f without reaching indicia 20e. The secondary beam 56f however can be viewed as the illumination marker 22f on the gauge 16f.

In operation, the light source 30 can be turned on to produce a calibration pulse, which is a secondary beam directed toward the photo-detector. The controller 34 can then determine the exact location of the secondary beam using the output signal of the photo-detector. The output signal will determine the zero sweep position and the controller 34 will use the signal to provide for accurate positioning of secondary beams 56a-56f. Assuming, by way of example, that the gauge 16f of the display 14 represents vehicle speed and a value of 50 miles per hour near the one-third of the set of indicia 20f is to be indicated, the vehicle inputs 36 are converted to a pulse count representing approximately one-third of the total pulse count required to displace the secondary beam 56f the full span of the gauge 16f. When the angular position determined from the angular position signal 74 satisfies a predetermined value, the controller 34 outputs a signal, hereinafter light control signal 80 that turns the light source 30 on and a stripe-like marker of light (e.g. the illumination marker 22f, FIG. 1) is caused to appear on the gauge 16f of the display 14. The light control signal 80 can include light duration and starting point with regard to the angular position signal 74 of the motor shaft 48. The controller 34 can also output a signal, hereinafter a shaft angular speed control signal 84 to the motor 52. The controller 34 can also have a light source driving function that compares the light signal 80 and the angular position signal 74, determined by signal interpretation algorithms in the controller 34, and switch the light source 30 on/off per the comparison result.

Figure 4:
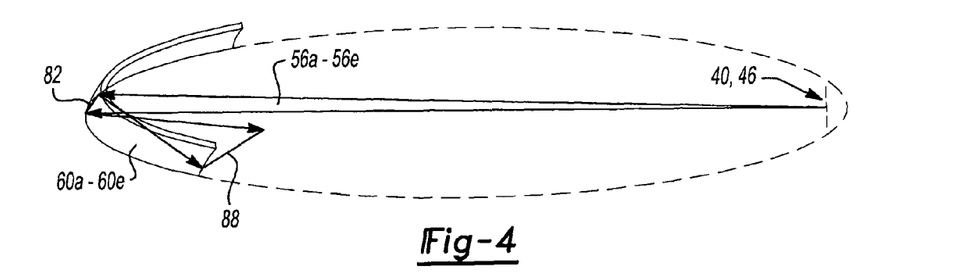
FIG. 4 is a perspective view of an elliptical reflector according to the present disclosure and shown on a three-dimensional ellipsoid.

According to the present disclosure, the controller 34 can output a signal (such as light control signal 80 described above) such that the light source 30 comes on at strategic times to create secondary beams 56a-56f. While the secondary beam 56f is directed toward the gauge 16f to create the illumination marker 22f, as described above, the secondary beams 56a-56e (FIG. 1) are each directed onto respective elliptical reflectors 60a-60e associated with the gauges 16a-16e. Each line of light 82 reflects off the respective elliptical reflector 60a-60e (i.e., the tertiary beams 62a-62e) and projected onto the semi-transparent opening 230, FIG. 6, which is viewable as another line of light 88, FIG. 4 or the illumination markers 22a-22e, FIG. 1.

In one example, when the optical device 42 rotates sufficiently to direct the secondary beam 56f onto the indicia 20f of the gauge 16f of the display 14, data from the vehicle inputs 36 can also be converted to pulse counts to cause the light source 30 to come on at strategic times directed onto the elliptical reflectors 60a-60e representing appropriate locations for illumination on the other gauges 16a-16e within the display 14 to show the measured quantities (such as illuminate at an appropriate location on the indicia 20a-20e). In one example, the optical device 42 can be rotated at a constant speed such as, but not limited to 3600 RPM, 60 Hz, thus, the display 14 is scanned repeatedly at a rate of approximately sixty times per second. In this way, each illumination marker, such as at 22a-22f is "refreshed" about sixty times per second and the characteristics of human sight are such that flicker will not be detected. The human eye will tend to blend the optical stimuli to create the appearance of continuous illumination markers in the display 14.

Figure 9:
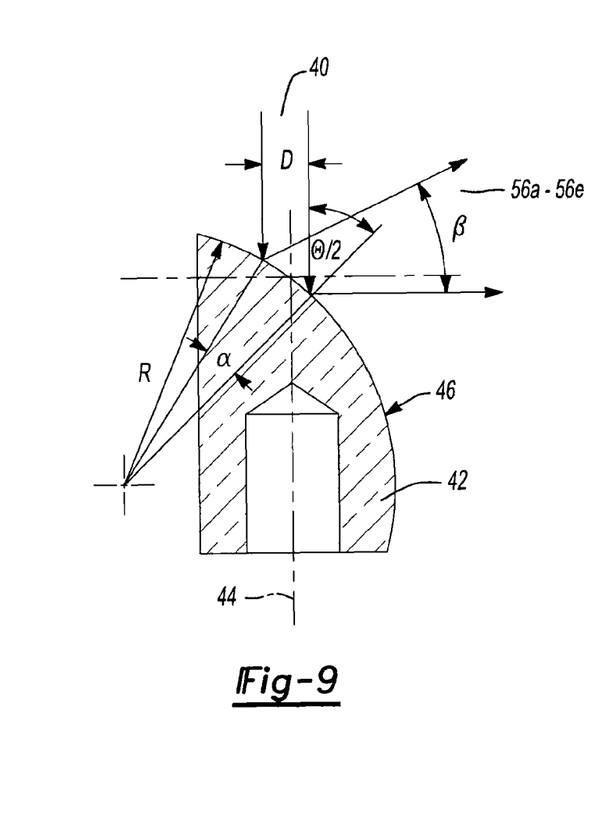
FIG. 9 is a cross-sectional view of the mirror shown in FIG. 2.

With additional reference now to FIG. 9, reflection of light on the optical device 42 according to the first example will be described. As shown, the incident beam 40 defines a width D and reflects off of the reflective surface 46 as the secondary beam 56a-56f. In one example, the reflective surface 46 can be a portion of a cylinder. For different configurations, various mirrors can be provided having dissimilar shapes.

For bottom incident:

$$R = \left\{ \frac{D}{2} \div \cos\left[180 - \left(90 - \frac{\alpha}{2}\right) - \frac{\theta}{2}\right] \right\} \div \sin\left(\frac{\alpha}{2}\right)$$

or $$R = \left\{ \frac{D}{2} \div \cos\left[180 - \left(90 - \frac{\beta}{4}\right) - \frac{\theta}{2}\right] \right\} \div \sin\left(\frac{\beta}{4}\right)$$

For top incident:

$$R = \left\{ \frac{D}{2} \div \cos\left[\left(90 - \frac{\alpha}{2}\right) - \frac{\theta}{2}\right] \right\} \div \sin\left(\frac{\alpha}{2}\right)$$

or $$R = \left\{ \frac{D}{2} \div \cos\left[\left(90 - \frac{\beta}{4}\right) - \frac{\theta}{2}\right] \right\} \div \sin\left(\frac{\beta}{4}\right)$$

Figure 3:
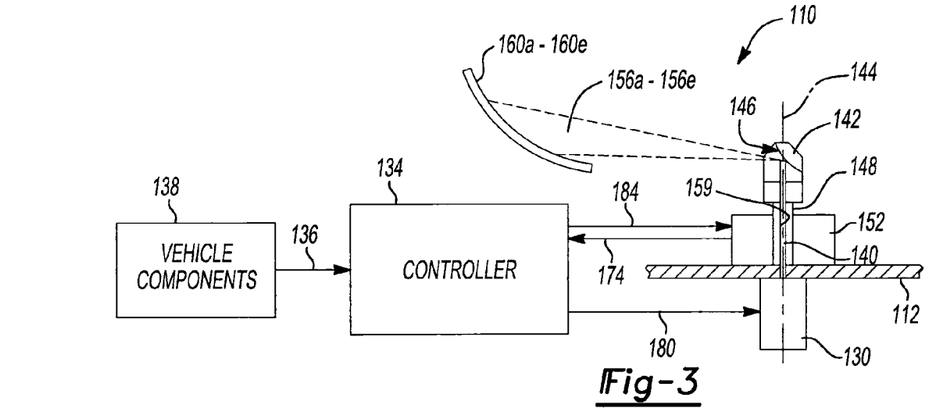
FIG. 3 is an exemplary cross-sectional view of an instrument cluster according to another example of the present teachings and including a mirror having a reflector surface internal to its body and being coupled to a motor through a cannulated shaft.
Figure 10:
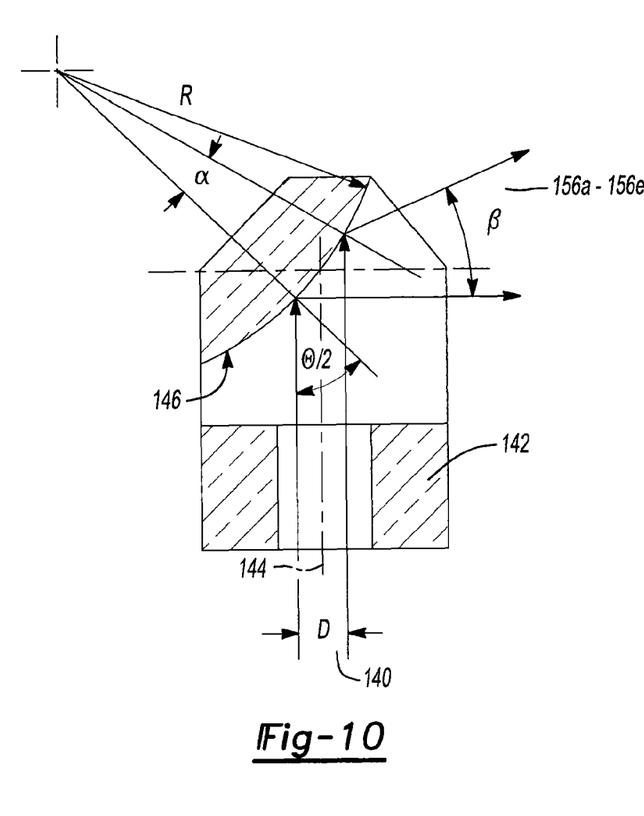
FIG. 10 is a cross-sectional view of the mirror shown in FIG. 3.

Where:
R: the radius of the surface of the mirror
D: the incident beam width
$\alpha$ the active arc angle of the mirror reflect surface
$\beta$ the desired spread angle of the secondary beam
$\theta$ the angle between the low edge of the secondary beam and the incident beam With reference now to FIGS. 3 and 10, a cluster 110 according to additional features of the present disclosure will be described. The cluster 110 can be configured similar to the cluster 10 and have like components identified by reference numerals increased by 100. As a result, like components will not be repeatedly described with respect to the example of FIGS. 4 and 6. In the example provided in FIGS. 3 and 10, the light source 130 is arranged on an opposite side of the fascia 112 as the motor 152. The motor shaft 148 is tubular and defines a cannulation 159 along its axis. The light source 130 is configured to emit incident light 140 through the cannulation 159 of the shaft 148 and onto a reflective surface 146 defined on the optical device 142. The incident light 140 reflects off the reflective surface 146 of the optical device 142 as a secondary beam 156a-156e and onto the respective elliptical reflectors 160a-160e and indicia 20e. As with the example described above with respect to FIGS. 2 and 9, the light source 130 is operable to emit the incident light 140 generally along the axis of rotation 144 of the optical device 142. As with the first example, such a configuration can allow the optical device 142 to reflect a secondary beam 156a-156f in a complete 360° sweep, thereby illuminating, in any combination, indicia 20a-20f provided on respective gauges 16a-16f.

Figure 5:
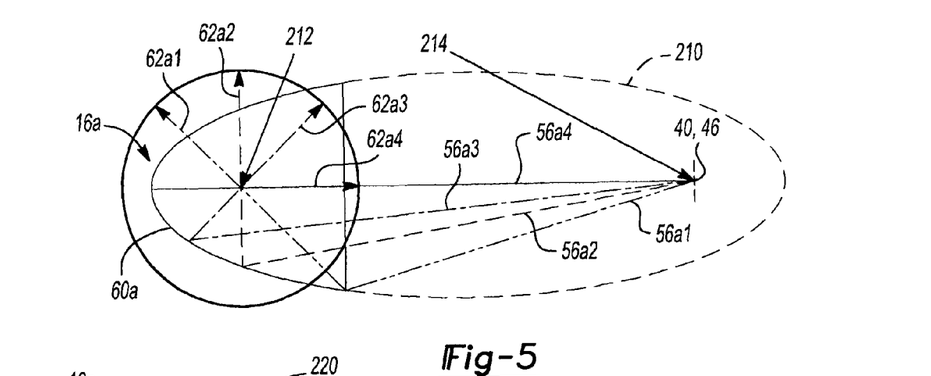
FIG. 5 is a cross-sectional view of the elliptical reflector illustrated in FIG. 4 and shown as part of a two-dimensional ellipse having a first and a second foci.

With additional reference now to FIGS. 5-8, additional features of the present teachings will now be described. As illustrated in FIG. 5, an ellipse 210 is shown. The ellipse 210 is shown associated with the elliptical reflector 60a of the gauge 16a. According to the present disclosure, a first foci 212 of the ellipse 210 is positioned on the axis of the centerpoint of the gauge 16a. A second foci 214 is located at a position that coincides with the incident beam 40 and the reflective surface 46 of the optical device 42. When a light ray bounces off the elliptical mirror 60a, it acts as though it has been reflected off a flat mirror, which is tangential to the ellipse at that point. Because the inside of the ellipse 210 (i.e., the elliptical reflector 60a) is a mirror, any light ray leaving one focus (i.e., the second foci 214), will always pass through the other focus (i.e., the first foci 212). With the alignment of the center of the gauge 16a at the first foci 212, the virtual pointer or visible light 22a (FIG. 1) appears to originate from the center of the gauge 16a, which is aesthetically pleasing to a user. Explained differently, the incident light 40, reflects off the reflective surface 46 of the optical device 42 as a secondary beam 56a1-56a4, reflects off the elliptical reflector 60a as a tertiary beam 62a1-62a4 and ultimately is visible to the user as an illumination marker 22a1-22a7 (see FIG. 6). The respective secondary beams 56a1-56a4 and tertiary beams 62a1-62a4 are shown as four distinct traces. It is appreciated that the secondary and tertiary beams of light can be at any angle as they are realized from reflection off the elliptical reflector 60a. Likewise, while the illumination markers 22a1-22a7 are shown on FIG. 6 as distinct traces, they are representative of the illumination markers at any angle which can be realized within a gauge span 220 of the gauge 16a.

Figure 6:
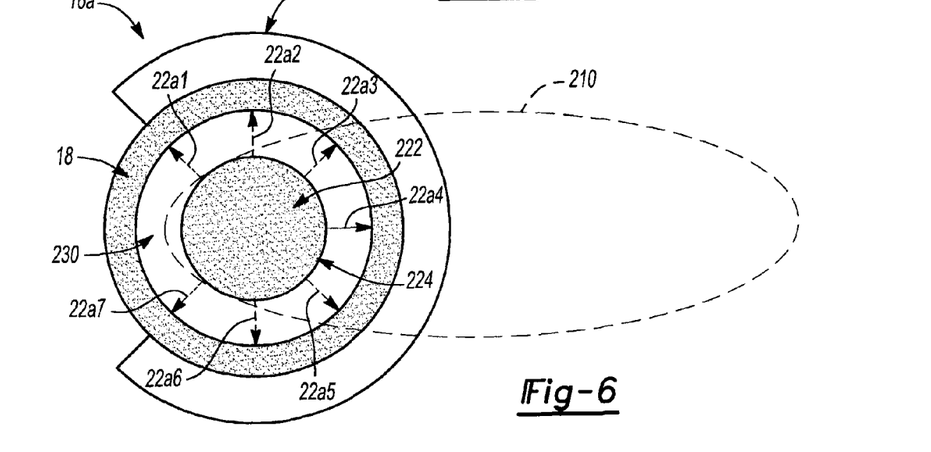
FIG. 6 is a top view of a gauge of FIG. 1, shown with an exemplary appliqué and the two-dimensional ellipse of FIG. 5 in phantom.
Figure 7:
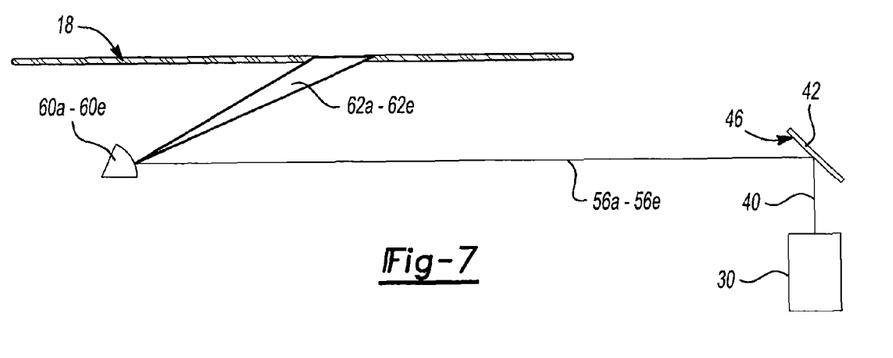
FIG. 7 is an exemplary cross-sectional view of an instrument cluster and shown with the exemplary appliqué of FIG. 6.
Figure 8:
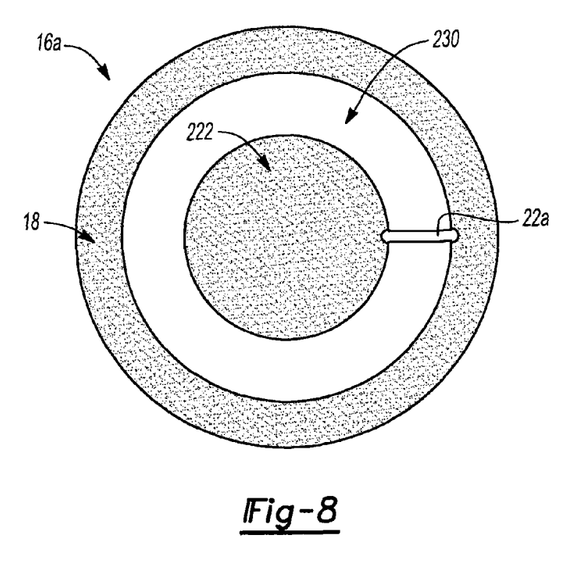
FIG. 8 is a top view of the gauge of FIG. 6.

As shown in FIG. 6, a cover 222 can be positioned generally at a central location on the gauge 16a. The cover 222 can define a non-transparent portion in the form of a circle having a perimeter 224. The appliqué 18 can further define a window or semi-transparent opening 230 at a location outboard of the cover 222. Again, while only the elliptical reflector 60a is shown in FIGS. 5, 6 and 8, it is appreciated that the other gauges 16b-16d can be formed similarly. With specific reference to FIG. 7, a diagram shows another implementation of the present teachings. The instant incident light 40, a circular beam, exiting the light source 30 is shown reflecting off the flat reflective surface 46 of the optical device 42. From the reflective surface 46, the secondary beams of light 56a-56e, still circular beams, are respectively directed toward the elliptical reflectors 60a-60e, which have curved cross section as shown in the diagram, associated with the respective gauges 16a-16e. The tertiary light 62a-62e, which is spread into a stripe shape beam, that is reflected off the respective elliptical reflectors 60a-60e can be directed through a respective window 230 on a respective gauge 16a-16d defined on the appliqué 18.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A display for measured quantities comprising:
   a gauge with a set of indicia spaced around the gauge to indicate the measured quantities;
   a window in the gauge extending along the set of indicia;
   an elliptical reflector positioned such that a first foci of the reflector is on the same axis as a center of the gauge;
   an optical device mounted on a shaft, the optical device being arranged to redirect a light beam from a second foci of the elliptical reflector onto the elliptical reflector to generate a virtual pointer in the window;
   a means for turning the shaft to rotate the optical device;
   a light source for projecting the light beam onto the optical device, rotation of the optical device enabling the virtual pointer to be selectively aimed at the set of indicia; and
   a controller responsive to the measured quantity to repeatedly turn the light source on at one or more selected scan positions of the optical device such that the position of the virtual pointer in the window is a representation of the current value of the measured quantity.

2. The display of claim 1 wherein the gauge further comprises an appliqué having the set of indicia formed therearound.

3. The display of claim 2 wherein the window is defined by a semi-transparent opening formed in the appliqué.

4. The display of claim 3 wherein the appliqué includes a non-transparent portion inboard of the window.

5. The display of claim 4 wherein the non-transparent portion is circular and defines a perimeter.

6. The display of claim 5 wherein a centerpoint of the non-transparent portion is on the axis of the first foci.

7. The display of claim 1 wherein the optical device is a mirror capable of re-directing and spreading the incident light beam.

8. The display of claim 1 wherein the optical device is a mirror capable of focusing the incident light beam.

9. The display of claim 1 wherein the means for turning the shaft comprises a motor located in a position intermediate of the mirror and the light source.

10. The display of claim 1 wherein the shaft is not located at the first foci.

11. The display of claim 1 wherein the shaft is located at the second foci.

12. A display for measured quantities comprising:
    a first gauge with a first set of indicia spaced around the first gauge to indicate a first set of measured quantities;
    a second gauge with a second set of indicia spaced around the second gauge to indicate a second set of measured quantities, the second gauge being located at a distinct location on the display relative to the first gauge;
    a first elliptical reflector positioned such that a first foci of the first reflector is on the same axis as a center of the first gauge;
    a second elliptical reflector positioned such that a first foci of the second reflector is on the same axis of a center of the second gauge and wherein the first and second elliptical reflectors define a common second foci;
    an optical device mounted on a shaft, the optical device being arranged to redirect a light beam from the second foci onto the first and second elliptical reflectors to generate a first and a second virtual pointer on each of the first and second gauges, respectively;
    a means for turning the shaft to rotate the optical device;
    a light source for projecting the light beam onto the optical device, rotation of the optical device enabling the virtual pointer to be selectively aimed at the first and second sets of indicia; and
    a controller responsive to the measured quantity to repeatedly turn the light source on at one or more selected scan positions of the optical device such that the position of each of the first and second virtual pointers is a representation of the current value of the respective first and second set of measured quantities.

13. The display of claim 12, further comprising a third gauge having a third set of indicia spaced around the third gauge to indicate a third set of measured quantities, wherein the optical device is arranged to redirect a light beam directly onto the third set of indicia without affecting the first and the second gauge.

14. The display of claim 12, further comprising an appliqué having the first and second set of indicia formed thereon.

15. The display of claim 14, further comprising a first and second semi-transparent opening formed in the appliqué on the first and second gauges, respectively.

16. The display of claim 15, further comprising a first and second non-transparent portion inboard of each of the first and second semi-transparent portions, respectively.

17. The display of claim 16 wherein both of the first and second non-transparent portions are circular and define a respective perimeter.

18. The display of claim 12 wherein the optical device is a mirror capable of re-directing and spreading the incident light beam.

19. The display of claim 12 wherein the optical device is a mirror capable of focusing the incident light beam.

* * * * *